United States Patent
Liou

(10) Patent No.: US 7,243,673 B2
(45) Date of Patent: Jul. 17, 2007

(54) GAS INJECTION DEVICE

(76) Inventor: Huei-Tarng Liou, 3F., No. 6, Alley 20, Lane 85, Changsing St., Da-an District, Taipei City 106 (TW)

( * ) Notice: Subject to any disclaimer, the term of this patent is extended or adjusted under 35 U.S.C. 154(b) by 144 days.

(21) Appl. No.: 11/214,112

(22) Filed: Aug. 29, 2005

(65) Prior Publication Data

US 2006/0045756 A1  Mar. 2, 2006

(30) Foreign Application Priority Data

Aug. 31, 2004  (TW) .............................. 93126284 A

(51) Int. Cl.
*F16K 1/14* (2006.01)
(52) U.S. Cl. ..................... 137/178; 137/177; 137/187; 55/430; 55/432
(58) Field of Classification Search ................ 137/177, 137/178, 183, 188, 192, 193, 197, 198, 203, 137/204; 55/430, 432, 466
See application file for complete search history.

(56) References Cited

U.S. PATENT DOCUMENTS

| | | | | | |
|---|---|---|---|---|---|
| 407,224 | A | * | 7/1889 | Leleand | 137/192 |
| 522,573 | A | * | 7/1894 | Burrows | 137/198 |
| 531,139 | A | * | 12/1894 | Smith et al. | 137/182 |
| 555,701 | A | * | 3/1896 | Howell | 137/181 |
| 578,873 | A | * | 3/1897 | Hermansader et al. | 137/203 |
| 689,366 | A | * | 12/1901 | Newbold et al. | 137/192 |
| 990,735 | A | * | 4/1911 | Heffernan et al. | 137/192 |
| 1,117,547 | A | * | 11/1914 | Beulke | 55/322 |
| 1,130,349 | A | * | 3/1915 | Templeton | 137/192 |
| 2,037,245 | A | * | 4/1936 | Leifheit et al. | 55/432 |
| 2,705,545 | A | * | 4/1955 | Gothberg | 137/204 |
| 2,709,679 | A | * | 5/1955 | Andrus | 137/177 |
| 2,737,364 | A | * | 3/1956 | Handwerk | 137/192 |
| 2,959,185 | A | * | 11/1960 | Deutsch | 137/204 |
| 3,841,064 | A | * | 10/1974 | Hitchiner et al. | 55/432 |
| 3,890,122 | A | * | 6/1975 | Frantz | 55/432 |
| 5,022,114 | A | * | 6/1991 | Kauffeldt et al. | 137/205 |
| 6,026,842 | A | * | 2/2000 | Gallant | 137/202 |
| 6,513,187 | B1 | * | 2/2003 | Naseth, Sr. | 137/205 |

* cited by examiner

*Primary Examiner*—Eric Keasel
*Assistant Examiner*—Craig Price
(74) *Attorney, Agent, or Firm*—Ladas & Parry

(57) ABSTRACT

The subject invention is related to a gas injection device with back-flow leaking liquid discharge, comprising a chamber, a gas inlet conduit, a gas outlet conduit, and a liquid discharging conduit, wherein the gas outlet conduit and the liquid discharging conduit are provided with a check valve, respectively. When a gas is passed to the chamber through the gas inlet conduit, the check valve of the gas outlet conduit is open for the gas to be passed into a liquid and the check valve of the liquid discharging conduit is closed. While the gas has stopped injecting into the liquid, the check valve of the gas outlet is closed to prevent the liquid from back flow. The small amount of back-flow leaking liquid accumulated in the chamber can open the check valve of the liquid discharging conduit to discharge the leaking liquid from the chamber.

6 Claims, 2 Drawing Sheets

GAS INJECTION DEVICE

FIELD OF THE INVENTION

The invention relates to a gas injection device capable of discharging leaking liquid. The device of the invention can be applied to a suction (negative pressure) type of gas injection device or a positive pressure type of gas injection device to effectively prevent the liquid in the gas outlet conduit from flowing back and to allow the back-flow leaking liquid in the gas injection device to discharge.

BACKGROUND OF THE INVENTION

While gas, such as ozone, oxygen, carbon dioxide, chlorine, etc., is to be injected into a liquid through a gas injection device, such as a negative pressure type (such as a Venturi tube) or a positive pressure type (such as a diffuser), there must be a check valve/check valves in the injection device to prevent back flow. The conventional types of check valve include the spring-gas balanced pressure type, the back-flow water pressure surface closure mechanical switch type, etc. The former is highly sensitive to pressure change; thus it may have the disadvantage of blocking fluid flow. Further, it is frequently subject to malfunction due to the fatigue of the spring or the pressure fluctuation in the gas injection device, whereas the latter is frequently subject to malfunction resulting from a defect in mechanical manufacture and structure. In addition, the back-flow leaking liquid from the check valve structure may gradually accumulate in the gas injection device and cannot be discharged smoothly, therefore hampering normal operation of the gas injection device.

Accordingly, the liquid back flow through the gas outlet conduit and the discharge of the back-flow liquid accumulated in the gas injection device are the serious problems that need to be overcome.

SUMMARY OF THE INVENTION

The object of the invention is to provide a gas injection device that may discharge back-flow leaking liquid. The gas injection device is used to inject a gas into a liquid device, and discharge the leaking liquid effectively by way of a liquid discharging channel located at the lower part of the injection device and the provision of a special check valve in the channel.

To achieve the above object, the invention discloses a gas injection device comprising a chamber, a gas inlet conduit, a gas outlet conduit, and a liquid discharging conduit. Both the gas inlet conduit and the gas outlet conduit are provided at the upper part of the gas injection device, while the liquid discharging conduit is provided at the lower part of the device and extends upward into the chamber of the device with a downward bend in the chamber. Each of the gas outlet conduit and the liquid discharging conduit comprises a check valve, and each check valve contains a movable blocker. When the blocker moves to an opening of the check valve, the blocking surface of the blocker contacts and fits with the inner surface of the check valve at one end to achieve a sealing effect, and when the blocker moves to the other end of the check valve, the fluid may pass through a plurality of flow channels formed on the blocker.

When the gas injection device of the invention is of a negative pressure type, the pressure in the chamber is at a pressure relatively lower than that of the environment (or negative pressure), and the blockers within the check valves in the gas outlet conduit and the liquid discharging conduit move downwardly to close the check valves. Gas is sucked into the chamber through the gas inlet conduit. Under this condition, gas pressure on the blocker of the check valve results in a force greater than the weight of the blocker, lifting the blocker upward, and thus opening the check valve and allowing the gas to be injected into a liquid smoothly through the gas outlet conduit. As to the liquid discharging conduit, since the pressure in the device is lower than the ambient pressure, the blocker of the check valve in the liquid discharging conduit is subject to a downward force. In addition to the weight of the blocker, the blocker is pushed downwardly to close the check valve and prevent the gas from leaking out. When the gas is not injected into the liquid, the back-flow liquid will push the blocker of the gas outlet conduit downward. In addition to the weight of the blocker, the check valve of the gas outlet conduit is closed to prevent back flow.

However, if there is a small amount of back-flow liquid from the check valve of the gas outlet conduit, the chamber of the device may serve as a buffer for the back-flow liquid. When the liquid in the chamber reaches a certain level, the liquid buoyancy can overcome the weight of the check valve blocker in the liquid discharging conduit and lift the blocker; thereby, the liquid may be discharged through the liquid discharging conduit.

When the gas injection device of the invention is of a positive pressure type, the device may have a structure similar to that of the above-mentioned negative pressure type of device, and the differences lie only in that the blocker moves upwardly to close the check valve and in that the limitation is on the weight of the blockers. The positive pressure injection type differs from the negative pressure type in that the pressure in the chamber is positive and the upward force imposed by gas on the blocker of the check valve is greater than the weight of the blocker, thus pushing the blocker of the check valve upward, and the check valve is closed to prevent the gas from leaking out. If there is back-flow liquid, the weight of the blocker of the check valve in the liquid discharging conduit is selected so that its weight is greater than the force imposed by the liquid on the blocker and the blocker will not be moved upward to close the check valve, thus keeping the check valve open to discharge the liquid from the liquid discharging conduit.

The characteristics of the invention will become apparent to those skilled in the art by making reference to the drawings of the invention and the following detailed descriptions of the preferred embodiments.

DETAILED DESCRIPTION OF THE PREFERRED EMBODIMENTS

The invention relates to a gas injection device with different embodiments, depending on whether it is applied to a negative pressure gas injection device or a positive pressure gas injection device.

Figure 1:
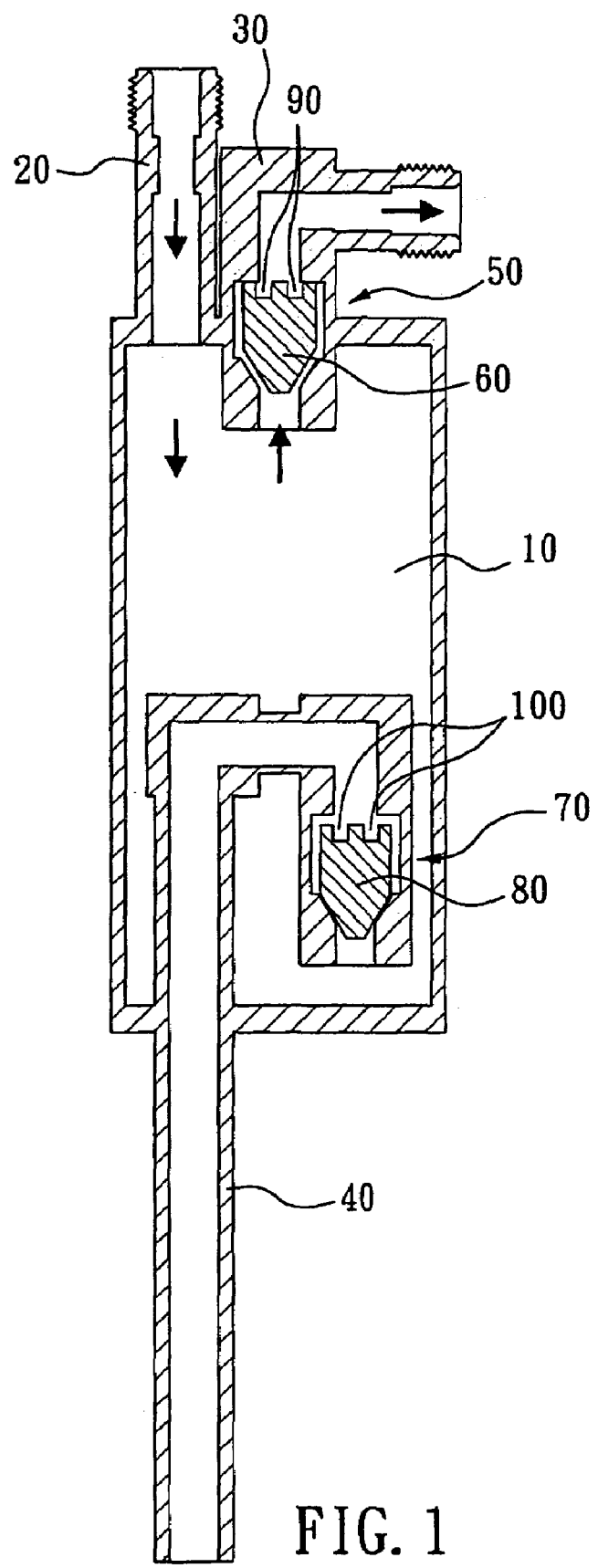
FIG. 1 is a sectional view of the negative pressure type of gas injection device of the invention.

The first embodiment of the invention is a gas injection device of negative pressure type, and its sectional view is shown in FIG. 1. The gas injection device mainly comprises a chamber 10, a gas inlet conduit 20, a gas outlet conduit 30, and a liquid discharging conduit 40. The gas outlet channel 30 and the liquid discharging channel 40 each are provided with a check valve 50, 70, respectively, which are referred to as the first check valve 50 and the second check valve 70, respectively.

The first check valve 50 and the second check valve 70 are of similar structure, containing a blocker 60, 80, respectively, which may move up and down in the internal space of the check valves. The blockers 60, 80 each have a conical end at the lower end and have a plurality of flow channels 90, 100 at the upper end. The lower opening of the check valve forms a conical inner surface so as to contact and fit with the conical end of the blocker. When the blockers 60, 80 move to the lower openings, the first check valve 50 and the second check valve 70 are closed to prevent fluid from going through, and when the blockers 60, 80 move to the upper openings at the other ends of the first and the second check valves 50, 70, the fluid may pass through the first check valve 50 and the second check valve via the flow channels 90 and 100.

The chamber 10 has an upper part and a lower part. Both the gas inlet conduit 20 and the gas outlet conduit 30 are located on the upper part of the chamber 10 of the gas injection device, while the liquid discharging conduit 40 is located at the lower part of the chamber 10 and extends upwardly into the chamber 10 with a downward bend in the chamber 10.

The conical ends of the blockers 60, 80 within the first check valve 50 and second check valve 70 are oriented downwardly so as to close the check valves 50, 70 by the weight of the blockers 60, 80 themselves.

When a gas is fed in through the gas inlet conduit 20, the gas pressure imposed on the blocker 60 is greater than the weight of the blocker 60, therefore lifting up the blocker 60 and opening the check valve 50 so that the gas may pass through the valve via the flow channels 90. In addition, the negative pressure in the chamber 10 tends to suck the ambient air into the chamber 10 via the liquid discharging conduit 40. Thus, in addition to the weight of itself, the blocker 80 also bears downward pressure, so that the check valve 70 is securely closed. In this case, the gas is injected into a liquid only through the gas outlet conduit 30 and will not leak out through the liquid discharging conduit 40.

When the gas has stopped feeding into the liquid, the liquid in the liquid device (not shown) connected with the gas outlet conduit 30 may possibly flow back into the gas outlet conduit 30. However, the back-flow liquid will push the blocker 60 downward, and the check valve 50 is closed securely by the blocker 60 to prevent the liquid from back flow with the addition of the weight of the blocker 60. However, if there is a small amount of back-flow liquid, the liquid will accumulate in the chamber 10, which serves as a buffer for the back-flow liquid. When the liquid in the chamber 10 has accumulated to reach a certain level and the force imposed by the liquid on the blocker 80 is greater than the weight of the blocker, the blocker will be moved upward to the open position, thereby the liquid can be discharged from the discharging conduit 40 through the flow channels 100.

Figure 2:
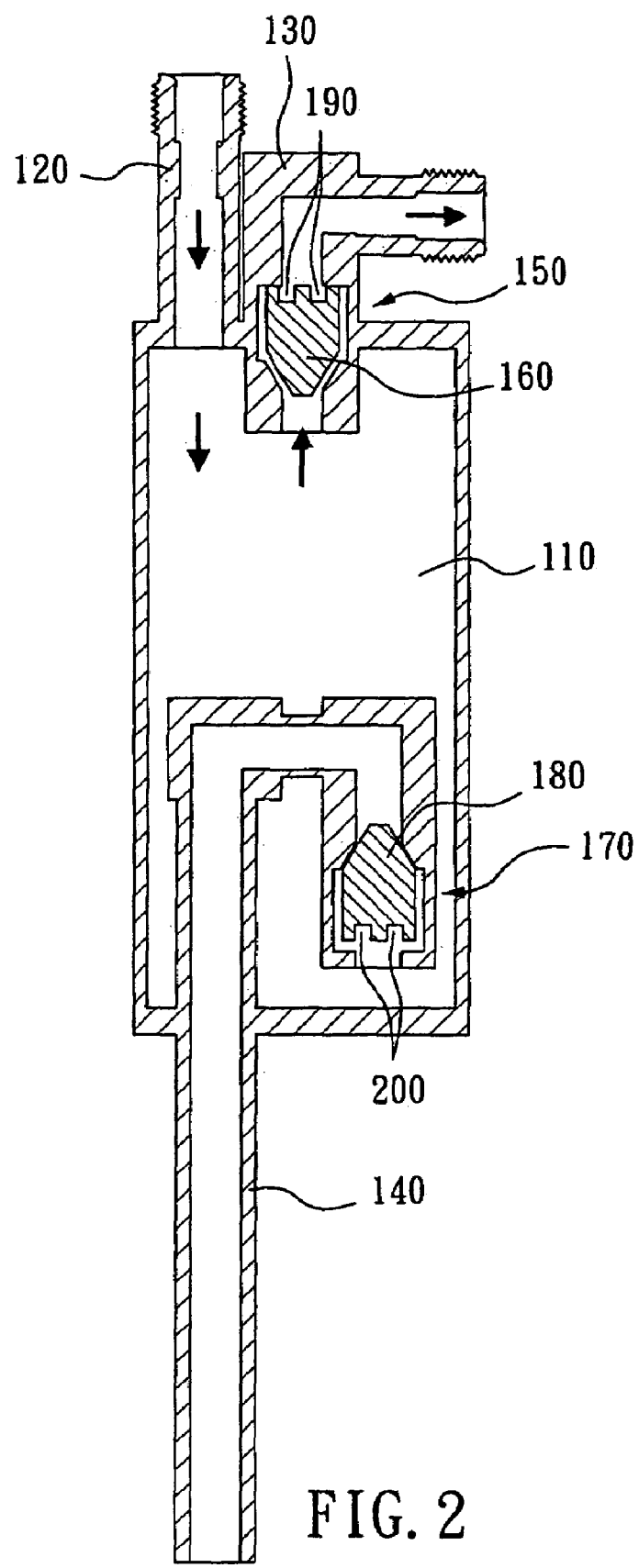
FIG. 2 is a sectional view of the positive pressure type of gas injection device of the invention.

Another embodiment of the invention is a gas injection device of positive pressure injection type, and its sectional view is shown in FIG. 2. The primary structure of the device shown in FIG. 2 is similar to that shown in FIG. 1 except that the second check valve 170 is in reverse direction with respect to the second check valve 70. See the previous embodiment for more detail.

A first check valve 150 is arranged in the gas outlet conduit 130 and has an inner blocker 160 with a downward conical end. Due to the weight of the blocker 160 itself, the blocker 160 is moved downwardly to close the check valve 150. A second check valve 170 is arranged in the liquid discharging conduit 140, and has an inner blocker 180 with an upward conical end. Due to the weight of the blocker 180 itself, the blocker 180 is moved downwardly to open the second check valve 170.

When a gas is fed in through the gas inlet conduit 120, the gas pressure imposed on the blocker 160 is greater than the weight of the blocker 160, therefore it lifts up the blocker 160 and opens the check valve 150 so that the gas may pass through the valve via the flow channels 190. In addition, the positive pressure of gas in the chamber 110 imposed on the blocker 180 is greater than the weight of the blocker 180, and lifts the blocker 180 upward to close the check valve 170. In this case, the gas is injected into a liquid only through the gas outlet conduit 130 and will not leak out through the liquid discharging conduit 140.

When the gas has stopped feeding into the liquid, the liquid in the liquid device (not shown) connected with the gas outlet conduit 130 may possibly flow back into the gas outlet conduit 130. However, the back-flow liquid will push the blocker 160 downward, and the check valve 150 is closed securely by the blocker 160 to prevent the liquid from back flow with the addition of the weight of the blocker 160. However, if there is a small amount of back-flow liquid amount, the liquid will accumulate in the chamber 110, which serves as a buffer for the back-flow liquid. When the liquid in the chamber 110 has accumulated to reach a certain level and the force imposed by the liquid on the blocker 180 is smaller than the weight of the blocker 180, the blocker will be moved downward to the open position, and thereby the liquid can be discharged from the discharging conduit 140 through the flow channels 200.

The invention may also be implemented in other specific modes without departing from the spirit and the essence of the invention. Thus, the above-mentioned embodiments shall be regarded as explanatory but not restrictive. All changes in consistency with the meaning and range of the claims and the equivalents shall fall within the scope claimed by the invention.

What is claimed is:

1. A gas injection device, used to inject a gas into a liquid device containing a liquid, comprising:
    a chamber having an upper part and a lower part;
    a gas inlet conduit, connecting to the upper part of the chamber for passing a gas into the chamber;
    a gas outlet conduit, connecting to the upper part of the chamber for passing the gas out of the chamber; the gas outlet conduit containing a first check valve which is vertically operable; and
    a liquid discharging conduit, connecting to the lower part of the chamber and extending into the chamber, with an end of the liquid discharging conduit inside the chamber bending downward and containing a second check valve which is vertically operable;
    wherein,
    the first check valve has a blocker, the weight of which facilitating it to close the first check valve is selected to be smaller than the upward force imposed by the gas on the blocker in the chamber;
    the second check valve has a blocker, the weight of which facilitating it to close the second check valve is selected to be greater than the upward force imposed by the gas on the blocker in the chamber, but is smaller than the upward force imposed on the blocker by the liquid which flows back through the gas outlet conduit from the liquid device and is accumulated at the bottom of the chamber.

2. The gas injection device of claim 1, wherein each of the check valves has an internal space, said internal space has a first opening and a second opening, and one end of each of the blockers has a blocking surface for closing the check valve while the other end has a plurality of flow channels, wherein with each of the blockers moving to its respective first openings, the first opening is blocked by the blocker so as to close each of the check valves, and with each of the blockers moving to the respective second openings, each of the check valves is opened.

3. The gas injection device of claim 2, wherein the blocking surface and the inner surface of the first opening are shaped as complementary conical surfaces to closely fit with each other.

4. A gas injection device, which is used to pass a gas into a liquid device containing a liquid, comprising:
   a chamber having an upper part and a lower part;
   a gas inlet conduit, connecting to the upper part of the chamber for passing a gas into the chamber;
   a gas outlet conduit, connecting to the upper part of the chamber for passing the gas out of the chamber; the gas outlet conduit containing a first check valve which is vertically operable; and
   a liquid discharging conduit, connecting to the lower part of the chamber and extending into the chamber, with an end of the liquid discharging conduit inside the chamber bending downward and containing a second check valve which is vertically operable;
wherein,
   the first check valve has a blocker, the weight of which facilitating it to close the first check valve is selected to be smaller than the upward force imposed by the gas on the blocker in the chamber;
   the second check valve has a blocker, the weight of which facilitating it to close the second check valve is selected to be smaller than the upward force imposed by the gas on the blocker in the chamber, but is greater than the upward force imposed on the blocker by the liquid which flows back through the gas outlet conduit from the liquid device and is accumulated at the bottom of the chamber.

5. The gas injection device of claim 4, wherein each of the check valves has an internal space, said internal space has a first opening and a second opening, and one end of each of the blockers has a blocking surface for closing the check valve while the other end has a plurality of flow channels, wherein with each of the blockers moving to its respective first openings, the first opening is blocked by the blocker so as to close each of the check valves, and with each of the blockers moving to the respective second openings, each of the check valves is opened.

6. The gas injection device of claim 5, wherein the blocking surface and the inner surface of the first opening are shaped as complementary conical surfaces to closely fit with each other.

* * * * *